(12) United States Patent
Isaka et al.

(10) Patent No.: US 6,764,669 B2
(45) Date of Patent: Jul. 20, 2004

(54) METHOD FOR PRODUCING FLUORINATED POTASSIUM TANTALATE CRYSTAL

(75) Inventors: Hiromichi Isaka, Tokyo-To (JP); Kenji Higashi, Tokyo-To (JP); Yoshitsugu Uchino, Tokyo-To (JP); Shigeru Kuwabara, Tokyo-To (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 130 days.

(21) Appl. No.: 10/111,638
(22) PCT Filed: Dec. 28, 2000
(86) PCT No.: PCT/JP00/09436
§ 371 (c)(1),
(2), (4) Date: Apr. 26, 2002
(87) PCT Pub. No.: WO01/47813
PCT Pub. Date: Jul. 5, 2001

(65) Prior Publication Data
US 2003/0068267 A1 Apr. 10, 2003

(30) Foreign Application Priority Data
Dec. 28, 1999 (JP) .......................... 11-373290
Sep. 4, 2000 (JP) .......................... 2000-267395

(51) Int. Cl.$^7$ .............................. C01G 35/00
(52) U.S. Cl. ...................... 423/464; 423/463
(58) Field of Search ................. 423/464, 463, 423/492

(56) References Cited

U.S. PATENT DOCUMENTS
3,907,976 A  9/1975  Hogan, Jr. et al. .......... 423/464

FOREIGN PATENT DOCUMENTS
| JP | 49-32897 | 3/1974 |
| JP | 01192728 | 8/1989 |
| JP | 04-21524 | 1/1992 |

*Primary Examiner*—Ngoc-Yen Nguyen
(74) *Attorney, Agent, or Firm*—Webb Ziesenheim Logsdon Orkin & Hanson, P.C.

(57) ABSTRACT

Disclosed herein is a method for producing potassium fluorotantalate crystals, comprising heating, to 60° C. or higher, a starting solution prepared by adding hydrofluoric acid and hydrochloric acid, and, if necessary, water to a highly pure tantalum solution, adding potassium chloride to this starting solution, and cooling the mixture to 40° C. or lower at a cooling rate of less than 15° C./h to precipitate potassium fluorotantalate crystals, wherein the concentration of the hydrofluoric acid in the starting solution is not more than 20% by weight. By this method, highly pure, large-sized potassium fluorotantalate crystals can successfully be obtained in high yield. Moreover, disadvantages to equipment and operation in the prior art can be overcome to a significant extent with this method.

18 Claims, 3 Drawing Sheets

METHOD FOR PRODUCING FLUORINATED POTASSIUM TANTALATE CRYSTAL

BACKGROUND OF THE INVENTION

1. Field of the Invention

The present invention relates to a method for producing potassium fluorotantalate crystals by which highly pure, large-sized potassium fluorotantalate crystals can be obtained in high yield and which is almost free from disadvantages to equipment and operation in the prior art; and to potassium fluorotantalate crystals produced by this method.

2. Background Art

Potassium fluorotantalate is used for the production of tantalum powder; it is particularly important as raw material for tantalum condensers. A general process of producing potassium fluorotantalate in the prior art is shown in FIG. 3. As shown in this figure, raw material such as tantalite ore or tantalum condenser scrap is firstly crushed, and dissolved by adding thereto hydrofluoric acid. Thereafter, sulfuric acid is added to this solution to adjust its concentration, and the solution adjusted is filtered through a filter press to obtain a clean solution, which is then subjected to solvent extraction. The solution is brought into contact with an organic solvent MIBK to extract tantalum and niobium, and the extract is back-extracted with dilute sulfuric acid to remove niobium. The remaining organic phase is then back-extracted with water, thereby obtaining a purified tantalum solution.

The tantalum solution thus obtained is subjected to the following two steps: a first step in which an aqueous solution containing K derived from KF, KCl, $K_2CO_3$, KOH or the like is added to the tantalum solution to precipitate crude potassium fluorotantalate crystals, and the crude crystals are separated by filtration; and a second step in which the crude potassium fluorotantalate crystals are dissolved in a hot dilute hydrofluoric acid solution, and the solution is then cooled to recrystallize highly pure potassium fluorotantalate crystals. Thus, the production of highly pure potassium fluorotantalate crystals usually involves two crystallization steps in the prior art.

However, when a dilute hydrofluoric acid solution is used in the recrystallization step as in the above-described conventional process, the resulting crystals tend to be not satisfactorily large in size. Moreover, the solubility of potassium fluorotantalate in a dilute hydrofluoric acid solution is low, so that there can be obtained crystals only in a decreased amount per unit operation.

Japanese Laid-Open Patent Publication No. 32897/1974 discloses a method for purifying crude potassium fluorotantalate crystals by recrystallization, in which potassium fluorotantalate is crystallized not from a dilute hydrofluoric acid solution but from a hydrofluoric acid solution having a high concentration of 20 to 50% by weight. Although coarse crystals can be obtained by this method, a large amount of potassium fluorotantalate remains in the hydrofluoric acid solution after the crystallization by cooling has been completed, so that potassium fluorotantalate crystals cannot be obtained in sufficiently high yield. In addition, since a hydrofluoric acid solution, which is extremely reactive, is used at a high concentration, the equipment used is readily eroded, and the handling of the solution requires great care. This method thus has great disadvantages to equipment and operation.

SUMMARY OF THE INVENTION

The present invention has been accomplished under the above-described circumstances. An object of the present invention is therefore to provide a method for producing potassium fluorotantalate crystals by which highly pure, large-sized potassium fluorotantalate crystals can be obtained in high yield and which is almost free from disadvantages to equipment and operation in the prior art. Another object of the present invention is to provide potassium fluorotantalate crystals that can be obtained by this method.

The above object can be attained by a first embodiment of the present invention, that is, a method for producing potassium fluorotantalate crystals, comprising heating, to 60° C. or higher, a starting solution prepared by adding hydrofluoric acid and hydrochloric acid, and, if necessary, water, to a highly pure tantalum solution, adding potassium chloride to this starting solution, and cooling the mixture to 40° C. or lower at a cooling rate of less than 15° C./h to precipitate potassium fluorotantalate crystals, wherein the concentration of the hydrofluoric acid in the starting solution is not more than 20% by weight.

The above object can also be attained by a second embodiment of the present invention, that is, a method for producing potassium fluorotantalate crystals, comprising (a) a first step in which a potassium-containing electrolyte is added to a starting solution containing tantalum to precipitate crude potassium fluorotantalate crystals, and the crude crystals are separated by filtration, and (b) a second step in which, after heating, to 60° C. or higher, a recrystallization solvent which is an aqueous solution containing hydrochloric acid and hydrofluoric acid, the crude potassium fluorotantalate crystals are dissolved in this recrystallization solvent, and the solution is then cooled to 40° C. or lower at a cooling rate of less than 15° C./h to precipitate potassium fluorotantalate crystals.

The potassium fluorotantalate crystals produced by the method of the present invention have (i) a content of the impurities Fe, Ni, Cr, Mn and Cu, calculated from the total amount of the respective metallic elements, of 50 ppm by weight or less, or (ii) a content of the impurities Nb, Fe, Ni, Cr, Ca, Mg, Mn, Cu, Si, W, Al, Ti, Mo, Sn, Sb and S, calculated from the total amount of the respective metallic elements, of 100 ppm by weight or less. Further, the potassium fluorotantalate crystals of the invention contain 40% by weight or more of crystals whose sizes are 0.5 mm or more as determined by sieve analysis.

DETAILED DESCRIPTION OF THE INVENTION

The method for producing potassium fluorotantalate crystals according to the present invention and the potassium fluorotantalate crystals obtained by the method will be specifically described hereinafter. By the potassium fluorotantalate crystals are herein meant crystals essentially consisting of potassium fluorotantalate.

Figure 1:
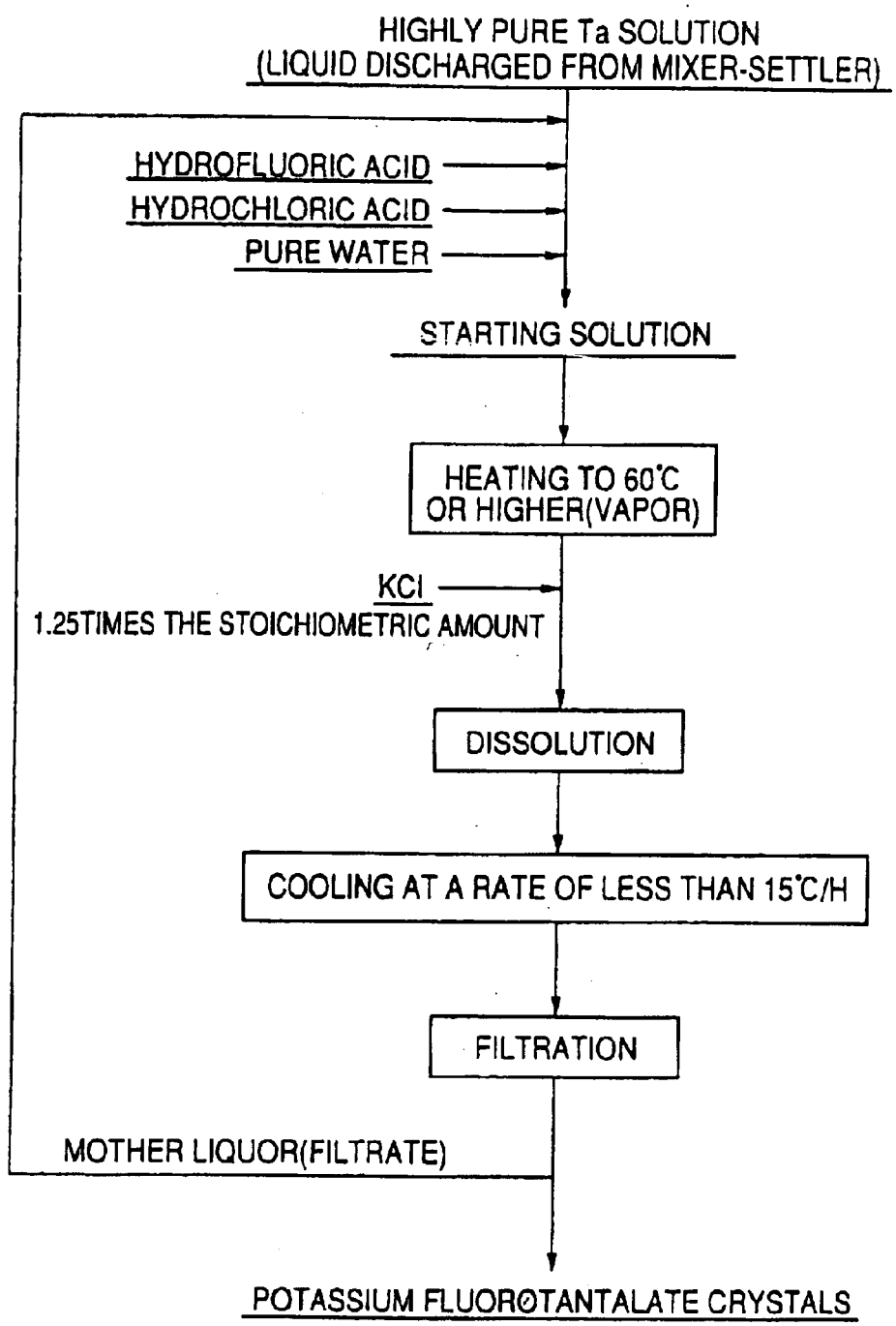
FIG. 1 is a flow chart showing a process of producing potassium fluorotantalate in the production method according to the first embodiment of the present invention.

Method for Producing Potassium Fluorotantalate Crystals According to the First Embodiment of the Invention A process of producing potassium fluorotantalate crystals according to the present invention is shown in FIG. 1. In the present invention, potassium fluorotantalate crystals are produced, as shown in FIG. 1, via the steps of (I) preparing a starting solution, (II) heating the starting solution, (III) dissolving potassium chloride in the starting solution, and (IV) cooling the solution.

By this production method according to the first embodiment of the present invention, it is possible to directly obtain large-sized potassium fluorotantalate crystals in large quantities without showing disadvantages to equipment and operation resided in the prior art. Further, nearly all of the filtrate obtained from the filtration of the crystals can be circulated and reused as mother liquor for subsequent crystallization. In this case, it is possible to make the loss of tantalum virtually nil.

(I) Preparation of Starting Solution

Figure 3:
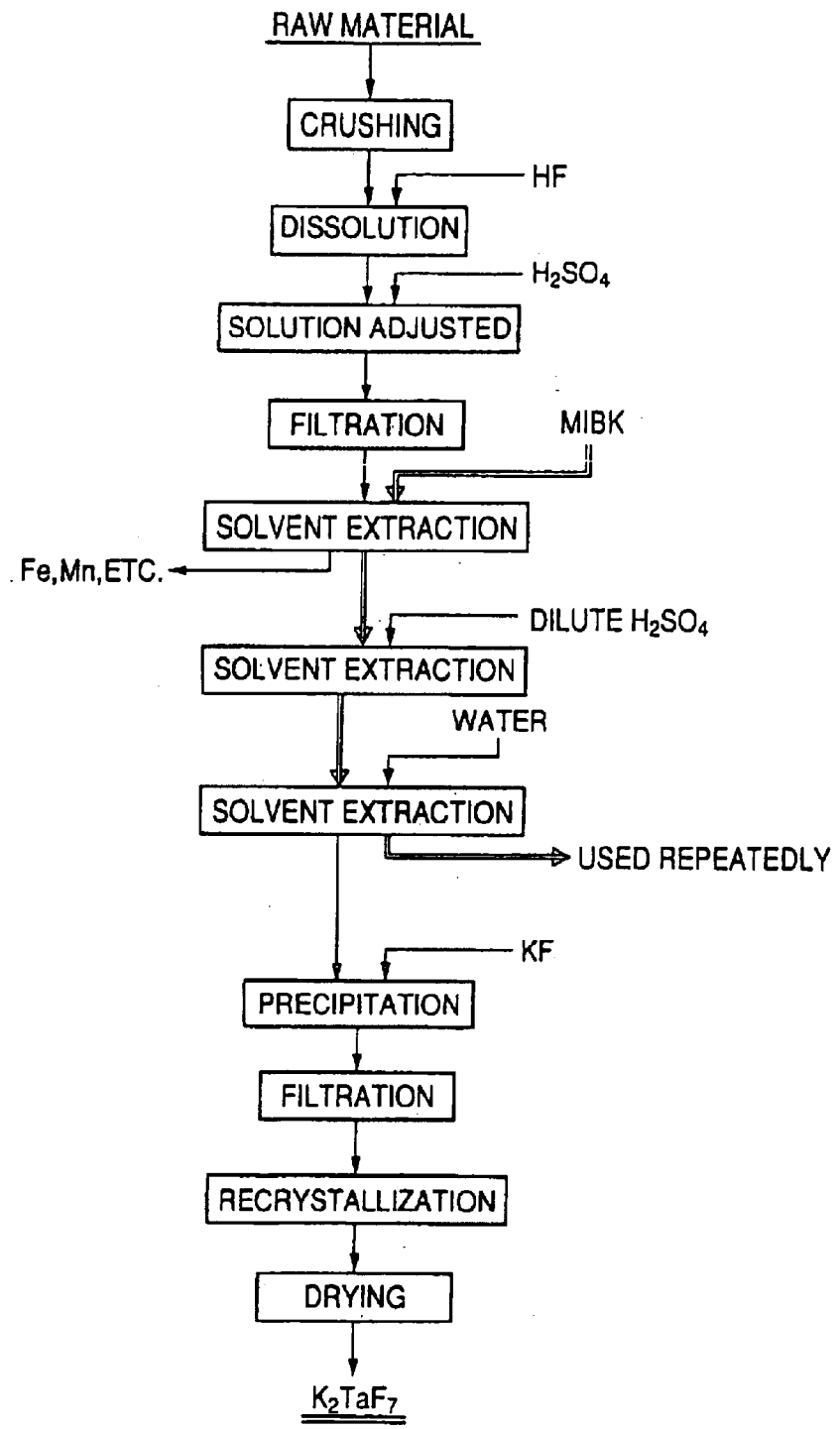
FIG. 3 is a flow chart showing one example of the process of producing potassium fluorotantalate in the prior art.

In the production method of the present invention, a mixture prepared by adding hydrofluoric acid and hydrochloric acid, and, if necessary, water to a highly pure tantalum solution is used as a starting solution. A highly pure tantalum solution prepared by any one of various known methods can be used herein. For example, it is possible to use an aqueous solution obtained from the back extraction of tantalum with water from MIBK as in the previously mentioned process shown in FIG. 3. There is no particular limitation on the concentration of tantalum in the highly pure tantalum solution. It is however preferable to make this concentration 20 g/l or more, more preferably 25 g/l or more. By doing so, it is possible to precipitate crystals in an increased amount per unit operation. Further, the purity of the tantalum in the highly pure tantalum solution is preferably 99% or more, more preferably 99.99% or more.

In the present invention, hydrofluoric acid and hydrochloric acid are added to this highly pure tantalum solution. In the case where the concentration of tantalum in the tantalum solution is excessively high, water may be added to dilute the solution. The concentration of hydrofluoric acid in the starting solution is not more than 20% by weight, preferably from 1 to 10% by weight, more preferably from 3 to 8% by weight. When the concentration of hydrofluoric acid in the starting solution is in excess of 20% by weight, the equipment used for production is readily eroded, and the handling of the starting solution requires great care because the reactivity of hydrofluoric acid is extremely high. Further, as long as the concentration of hydrofluoric acid in the starting solution is 1% by weight or more, $K_2TaF_7$ crystallizes more reliably without precipitating crystals having different crystalline structures.

Besides hydrofluoric acid, hydrochloric acid is incorporated into the starting solution for use in the present invention. By the incorporation of hydrochloric acid, the change in the solubility of potassium fluorotantalate in the starting solution before and after the cooling step, which will be described later, can be made great. It is considered that this is the reason why potassium fluorotantalate crystals can be obtained in large quantities although the concentration of hydrofluoric acid in the starting solution is low. There is no particular limitation on the concentration of hydrochloric acid in the starting solution, and it can be properly determined by taking the proportions of the other components in the starting solution, the desired amount of the crystals to be precipitated, etc. into consideration. According to a preferred embodiment of the present invention, it is preferable from the viewpoints of the solubility of potassium fluorotantalate in the starting solution and cost that the concentration of hydrochloric acid in the starting solution be from 1 to 6% by weight, more preferably from 3 to 4% by weight.

(II) Step of Heating

In the present invention, the starting solution prepared in the above-described step (I) is heated to 60° C. or higher, preferably to a temperature between 60° C. and 90° C., more preferably to a temperature between 70° C. and 80° C. Heating the starting solution only to a temperature of less than 60° C. is unfavorable because, in this case, only a decreased amount of crystals precipitate in the cooling step, resulting in decrease in yield. On the other hand, heating the starting solution to a temperature of not more than 90° C. is advantageous because, in this case, it is possible to avoid the erosion of the equipment used, and to reduce the operation cost.

(III) Step of Dissolving Potassium Chloride

In the present invention, potassium chloride is added to the starting solution that has been heated in the above step (II). When potassium chloride is added, the following reaction occurs to yield potassium fluorotantalate crystals:

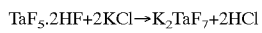

$$TaF_5 \cdot 2HF + 2KCl \rightarrow K_2TaF_7 + 2HCl$$

Potassium chloride may be added in the form of either solid or solution. It is however preferable to add potassium chloride in the form of solid because, by doing so, it is possible to reduce the quantity of liquid, and, consequently, to decrease the quantity of waste water. The amount of potassium chloride to be added is preferably from 1.2 to 1.3 times, for instance, 1.25 times the stoichiometric amount. When the amount of potassium chloride added is below the above range, the resulting potassium fluorotantalate has decreased crystallinity. On the other hand, when the amount of potassium chloride added is in excess of the above-described range, an increased part of the potassium chloride does not contribute to the formation of crystals; this is disadvantageous from the economical point of view.

(IV) Step of Cooling

In the present invention, the solution obtained in the above-described step (III) is cooled to precipitate potassium fluorotantalate crystals. The solution is herein cooled to 40° C. or lower, preferably 30° C. or lower. When the solution is cooled only to a temperature of more than 40° C., the crystals cannot precipitate in a satisfactorily large amount, so that the yield is low.

In this cooling step, it is necessary to cool the solution at a cooling rate of less than 15° C./h, preferably less than 10° C./h, more preferably less than 8° C./h. As long as the cooling rate is in the above range, the potassium fluorotantalate crystals grow satisfactorily large. The reason for this is considered that the rate of crystal growth is greater than that of formation of fine crystals.

(V) Optional Steps

In the present invention, the potassium fluorotantalate crystals may be separated by filtration from the solution obtained in the above step (IV). In addition, a preferred embodiment of the present invention may further comprise the step of circulating the filtrate obtained from the filtration as a part of or whole of the starting solution. In this case, nearly all of the filtrate obtained can be recycled as mother liquor for subsequent crystallization, so that the valuable tantalum resources can be effectively utilized without being lost at all. Moreover, since the filtrate contains hydrofluoric acid, hydrochloric acid and potassium, it is possible to make the amounts of hydrofluoric acid, hydrochloric acid and potassium chloride to be added much smaller than the amounts of these compounds that are added in the case where the filtrate is not circulated. It is noted that, when the filtrate is circulated, it is preferable to make the concentration of tantalum in the highly pure tantalum solution higher.

This is because the proportion of the circulating solution can be made higher when the concentration of tantalum is higher.

The sizes of the potassium fluorotantalate crystals obtained by the above-described method of the present invention are as large as 0.5 mm or more, preferably 1.68 mm or more. When a powder of such large crystals is placed in a heating furnace located inside an apparatus for reduction with sodium, it is not blown-up in the melting furnace. Therefore, not only the inside of the apparatus is not stained with the powder, but also the loss of the powder is avoided. Thus, the potassium fluorotantalate crystals having such large sizes are significantly improved in handling properties. In addition, the purity of potassium fluorotantalate crystals depends on their sizes; and, in general, larger crystals are believed to have higher purity. That the potassium fluorotantalate crystals obtained by the method of the invention are large in size is therefore advantageous also in this respect.

Moreover, by the method of the present invention, it is possible to obtain potassium fluorotantalate crystals in an amount per unit operation of as large as approximately 1.4 times that of potassium fluorotantalate crystals obtainable by the conventional method.

Figure 2:
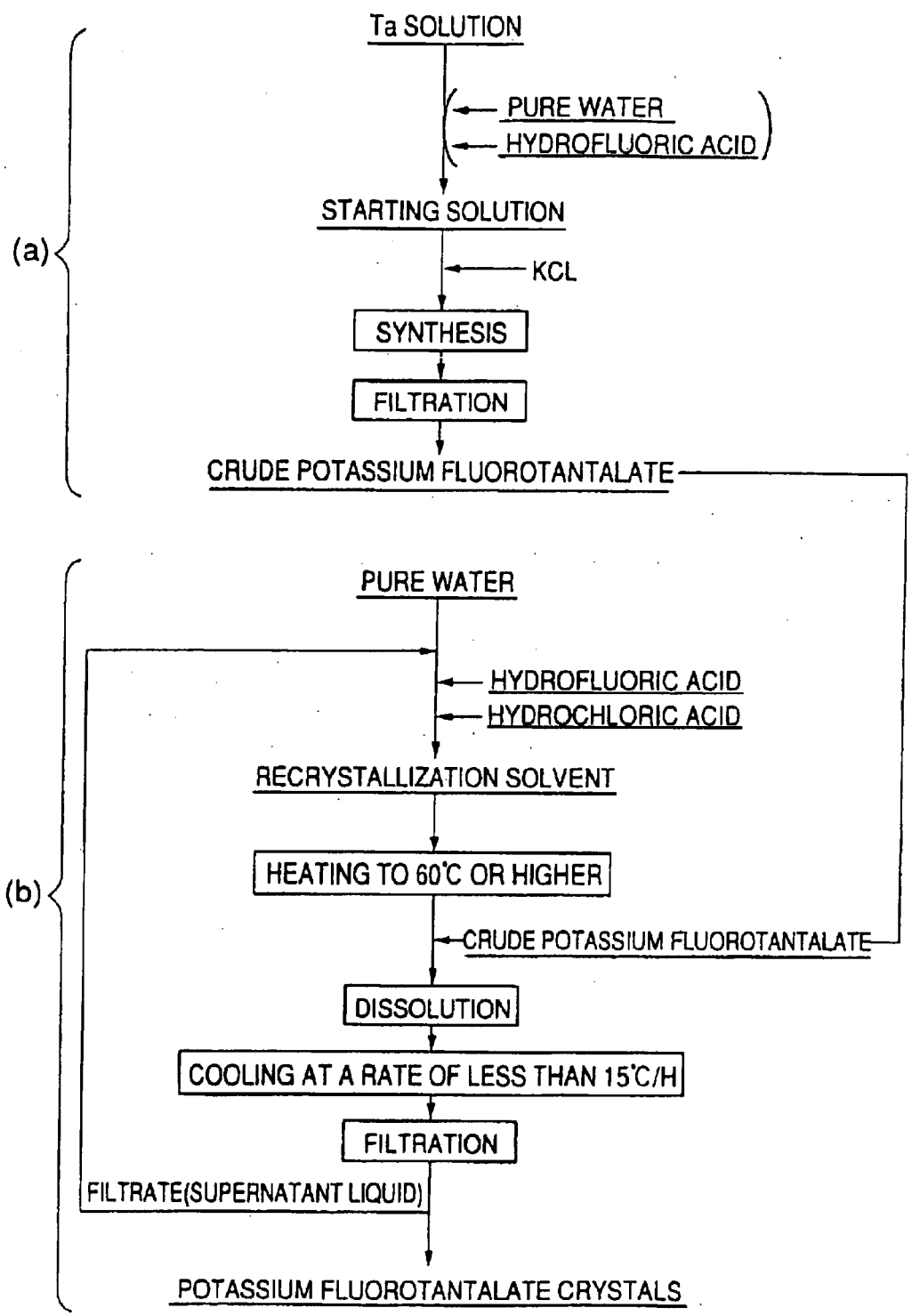
FIG. 2 is a flow chart showing a process of producing potassium fluorotantalate in the production method according to the second embodiment of the present invention.

Method for Producing Potassium Fluorotantalate Crystals According to the Second Embodiment of the Invention The process of producing potassium fluorotantalate crystals according to the second embodiment of the present invention is shown in FIG. 2. As shown in this figure, the method of the invention comprises the following two steps through which potassium fluorotantalate crystals can successfully be produced: (a) a first step in which crude potassium fluorotantalate crystals are synthesized; and (b) a second step in which the crude crystals are purified by recrystallization.

In this second embodiment of the present invention, a recrystallization solvent containing not only hydrofluoric acid but also hydrochloric acid is used in the above-described step (b) in which the crude potassium fluorotantalate crystals are purified by recrystallization. The use of such a recrystallization solvent is advantageous in that the concentration of hydrofluoric acid in the solvent can be suppressed to low and that, even when a tantalum solution containing a relatively large amount of impurities is used as the starting solution, highly pure potassium fluorotantalate crystals containing a minimum of impurities can be obtained in large quantities. Further, by controlling the temperature and cooling rate in the recrystallization step, it is possible to obtain sufficiently large-sized potassium fluorotantalate crystals in large quantities.

Starting Solution

In the production method according to the second embodiment of the present invention, a solution containing tantalum is used as the starting solution. A tantalum solution prepared by any one of various known methods can be used herein, and, moreover, any solvent can be used for preparing the solution. For example, it is possible to use an aqueous solution obtained from the back extraction of tantalum with water from MIBK as in the previously mentioned process shown in FIG. 3. Further, an aqueous solution which is obtained by dissolving low-impurity-content tantalum-containing scrap or the like by the use of hydrofluoric acid, and filtering the solution and which has not been subjected to solvent extraction may also be used as the tantalum solution. There is no particular limitation on the concentration of tantalum in the tantalum solution. It is however preferable to make this concentration between 20 g/l and 200 g/l. As long as the concentration of tantalum in the tantalum solution falls within this range, the crystals precipitate in an increased amount per unit operation, and, in addition, stirring and filtration can easily be done. Further, the purity of the tantalum in the tantalum solution is preferably 99% or more, more preferably 99.99% or more. In this production method of the invention, however, if the filtrate is not circulated, tantalum having a purity of at least 95% is enough to obtain potassium fluorotantalate crystals having sufficiently high purity. On the other hand, when nearly all of the filtrate is circulated and reused, it is preferable to use tantalum having a purity of 99% or more to reliably obtain highly pure potassium fluorotantalate crystals.

In a preferred embodiment of the present invention, this tantalum solution contains water and/or hydrofluoric acid. This means that water can be added to dilute the tantalum solution when the concentration of tantalum in the tantalum solution is excessively high and that hydrofluoric acid can be added as the source of fluorine which is needed for the synthesis of potassium fluorotantalate crystals. It is noted that, instead of hydrofluoric acid, potassium fluoride serving as a potassium-containing electrolyte, which will be described later, may also be utilized as the source of fluorine. In this case, it is not always necessary to incorporate hydrofluoric acid into the starting solution.

In the case where hydrofluoric acid is incorporated into the starting solution, the concentration of this acid in the starting solution is not more than 20% by weight, preferably from 1 to 10% by weight, more preferably from 3 to 8% by weight. As long as the concentration of hydrofluoric acid in the starting solution is in this range, the equipment used is hardly eroded, and, in addition, the starting solution is easy to handle.

(a) First Step (Step of Producing Crude Crystals)

In the first step of the present invention, a specific potassium-containing electrolyte is added to the above-described starting solution to precipitate crude potassium fluorotantalate crystals.

Any electrolyte can be used in the present invention as the potassium-containing electrolyte as long as it can supply potassium ion. Preferable examples of potassium-containing electrolytes include potassium chloride, potassium carbonate, potassium hydroxide, potassium fluoride, and combinations thereof. Of these, potassium chloride is preferred because it is easy to handle and inexpensive. Further, if potassium fluoride is used, potassium fluorotantalate crystals can successfully be synthesized by using a minimum amount of hydrofluoric acid, or without using hydrofluoric acid, so that disadvantages to equipment and operation in the prior art can be overcome to a significant extent.

When potassium chloride is added as the potassium-containing electrolyte, the following reaction occurs to yield crude potassium fluorotantalate crystals $K_2TaF_7$:

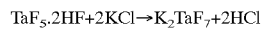

$$TaF_5 \cdot 2HF + 2KCl \rightarrow K_2TaF_7 + 2HCl$$

In the present invention, the potassium-containing electrolyte may be added in the form of either solid or solution. It is however preferable to add the potassium-containing electrolyte in the form of solid. This is because, by doing so, it is possible to reduce the quantity of liquid, and, consequently, to decrease the quantity of waste water. The amount of the potassium-containing electrolyte to be added is preferably from 1.2 to 2.0 times, for instance, 1.5 times the stoichiometric amount calculated in terms of potassium ion. When the amount of the potassium-containing electrolyte added is below the above-defined range, the resulting potassium fluorotantalate has decreased crystallinity. On the other hand, when the amount of the potassium-containing electrolyte is in excess of the above-described range, an increased part of the potassium-containing electrolyte does not contribute to the formation of crystals; this is disadvantageous from the economical point of view.

In a preferred embodiment of the present invention, the temperature of the starting solution at the time when the potassium-containing electrolyte is added thereto is between 30° C. and 70° C.; and that of the starting solution at the time when the crude potassium fluorotantalate crystals are separated therefrom by filtration is lower than 30° C. By controlling, at each operation, the temperature of the starting solution to the above-described range, the difference between the solubility of potassium fluorotantalate in the starting solution at the time of addition of the electrolyte and the one at the time of filtration becomes great, so that the crude crystals precipitate in an increased amount. The reason why the temperature of the starting solution at the time of addition of the potassium-containing electrolyte is restricted to a temperature between 30° C. and 70° C. is as follows. When this temperature is lower than 30° C., the difference between this temperature and the temperature of the starting solution at the time of filtration is small, so that crystals cannot fully grow. As a result, fine crystals precipitate, and it takes time to separate such fine crystals by filtration. When the temperature of the starting solution at the time of addition of the electrolyte is made higher than 70° C., the energy cost is increased. In addition, excessively large crystals are produced; it takes time to dissolve such large crystals in a recrystallization solvent in the second step. On the other hand, the reason why the temperature of the starting solution at the time when the crystals are separated therefrom by filtration is restricted to a temperature of less than 30° C. is as follow: as long as this temperature falls within this range, it is possible to decrease the amount of tantalum that remains in the filtrate after filtration, thereby making the loss of tantalum nearly nil.

In the first step of the present invention, the crystal-containing liquid obtained is filtered to separate the crude crystals. To decrease the amount of impurities, it is preferable to wash the crude crystals with a small amount of water or an aqueous potassium chloride solution. Although the crude potassium fluorotantalate crystals thus obtained have a considerably decreased impurity content, it is desirable to further decrease this content from a practical standpoint. Further, the crude potassium fluorotantalate crystals obtained are relatively small in size. In the present invention, therefore, the crude crystals are subjected to the second step (b) of recrystallization.

(b) Second Step (Step of Recrystallization)

In the second step of the present invention, after heating, to 60° C. or higher, a recrystallization solvent which is an aqueous solution containing hydrochloric acid and hydrofluoric acid, the crude potassium fluorotantalate crystals are dissolved in this recrystallization solvent, and the solution obtained is then cooled to 40° C. or lower at a cooling rate of less than 15° C./h to precipitate potassium fluorotantalate crystals.

Heretofore, a dilute hydrofluoric acid solution has generally been used as a solvent from which potassium fluorotantalate is recrystallized. As mentioned previously, however, there is such a tendency that, when a dilute hydrofluoric acid solution is used for recrystallization, satisfactorily large crystals cannot be obtained. Moreover, the solubility of potassium fluorotantalate in a dilute hydrofluoric acid solution is low, so that crystals precipitate only in a decreased amount per unit operation.

To overcome the above drawbacks, not only hydrofluoric acid but also hydrochloric acid is incorporated into the recrystallization solvent for use in the production method of the present invention. Specifically, the recrystallization solvent for use in the second step of the invention is an aqueous solution containing both hydrochloric acid and hydrofluoric acid. When hydrochloric acid is incorporated into the recrystallization solvent, the change in the solubility of potassium fluorotantalate in the recrystallization solvent before and after the subsequent cooling step becomes great. It is considered that this is the reason why potassium fluorotantalate crystals precipitate in large quantities although the concentration of hydrofluoric acid in the recrystallization solvent is low.

The following one-step process of producing potassium fluorotantalate crystals, not involving the second step (b) seems acceptable: hydrochloric acid is added, in the first step (a), to a starting solution having a relatively low concentration, and the mixture is heated to 60° C. or higher; a potassium-containing electrolyte is added to this mixture, and the mixture obtained is then gradually cooled to precipitate potassium fluorotantalate crystals. In this process, however, if a tantalum solution having a relatively high impurity content is used as the starting solution, an increased amount of impurities can remain in the crystals precipitated. On the other hand, in the present invention, hydrochloric acid is incorporated into the recrystallization solvent for use in the second step (b), so that it is possible to suppress the concentration of hydrofluoric acid low. Moreover, highly pure potassium fluorotantalate crystals containing a minimum amount of impurities can be obtained even when a tantalum solution containing a relatively large amount of impurities is used as the starting solution. It is thus considered that the incorporation of hydrochloric acid into the recrystallization solvent makes it possible to produce potassium fluorotantalate crystals whose purity is higher than that of potassium fluorotantalate crystals obtained without incorporating hydrochloric acid into the recrystallization solvent.

There is no particular limitation on the concentration of hydrochloric acid in the recrystallization solvent, and this concentration may be properly determined by taking the proportions of the other components in the recrystallization solvent, the desired amount of crystals to be precipitated, etc. into consideration. According to a preferred embodiment of the present invention, it is preferable from the viewpoints of the solubility of potassium fluorotantalate in the recrystallization solvent and cost that the concentration of hydrochloric acid in the recrystallization solvent be from 1 to 6% by weight, more preferably from 3 to 4% by weight. In addition, the incorporation of hydrochloric acid into the recrystallization solvent leads to the precipitation of crystals in an amount per unit operation of as large as 1.1 to 1.3 times that of crystals obtainable by the conventional method using no hydrochloric acid.

According to a preferred embodiment of the present invention, it is preferable to make the concentration of hydrofluoric acid in the recrystallization solvent not more than 20% by weight, preferably from 1 to 10% by weight, more preferably from 3 to 8% by weight. As long as the concentration of hydrofluoric acid in the recrystallization solvent is in the above-described range, the equipment used is hardly eroded, and, at the same time, it is easy to handle the starting solution. Further, as long as the concentration of hydrofluoric acid in the recrystallization solvent is 1% by weight or more, potassium fluorotantalate ($K_2TaF_7$) crystallizes more reliably without precipitating crystals having different crystalline structures. In particular, since hydrochloric acid is incorporated into the recrystallization solvent in the present invention, highly pure, large-sized potassium fluorotantalate crystals can be obtained in large quantities although the concentration of hydrofluoric acid in the recrystallization solvent is low.

In the second step of the present invention, after heating the recrystallization solvent to 60° C. or higher, preferably to a temperature between 60° C. and 90° C., more preferably to a temperature between 70° C. and 80° C., the crude potassium fluorotantalate crystals obtained in the first step (a) are dissolved in this recrystallization solvent. When the recrystallization solvent is heated only to a temperature of less than 60° C., only a decreased amount of crystals precipitate in the subsequent cooling step; that is, crystals cannot be obtained in high yield. On the other hand, as long as the recrystallization solution is heated to a temperature of not more than 90° C., the equipment used is not damaged, and the operation cost can be decreased.

It is necessary to dissolve the crude potassium fluorotantalate crystals in the recrystallization solvent in such an amount that the concentration of the crystals in the recrystallization solvent will be slightly lower than the solubility of potassium fluorotantalate in the same, which varies depending on the temperature of the crystal-dissolved solution and on the concentrations of hydrofluoric acid and hydrochloric acid in the recrystallization solvent. When the amount of the crude crystals dissolved in the recrystallization solvent is excessively large, a large part of the crude crystals remain undissolved, causing formation of fine crystals and contamination of impure crude potassium fluorotantalate crystals. On the other hand, when the amount of the crude potassium fluorotantalate crystals dissolved in the recrystallization solvent is too small, only a decreased amount of crystals can be obtained.

In the second step of the present invention, the recrystallization solvent in which the crude potassium fluorotantalate crystals have been dissolved is cooled to 40° C. or lower, preferably 30° C. or lower to precipitate potassium fluorotantalate crystals. When the solution is cooled only to a temperature of more than 40° C., a sufficiently large, amount of the crystals cannot be obtained; thus, the crystals cannot be produced in high yield.

It is necessary to conduct the above-described cooling step at a cooling rate of less than 15° C./h, preferably less than 10° C./h, more preferably less than 8° C./h. As long as the cooling rate is in the above-described range, the potassium fluorotantalate crystals grow satisfactorily large. The reason for this is considered that the rate of crystal growth is greater than that of formation of fine crystals. It is noted that the above cooling rate is not required to be approximately constant throughout the cooling step and that the cooling rate may vary in the course of the cooling step within the above-described range.

A preferred embodiment of the present invention may further comprise, prior to the step of cooling, the step of removing fine particles present in the recrystallization solvent in which the crude potassium fluorotantalate crystals have been dissolved. With this step, it is possible to prevent the precipitation of fine crystals originating from the fine particles, and to make the sizes of the crystals larger. Any method selected from various known methods can be used for removing the fine particles. However, the use of a mesh filter is preferred because the fine particles can be simply and conveniently removed with it. In the step of removing fine particles, the temperature of the recrystallization solvent in which the crude crystals have been dissolved tends to drop, and crystals begin to precipitate if the difference between the concentration and solubility of the crude crystals in the recrystallization solvent is not sufficiently great. It is therefore desirable to dissolve the crude potassium fluorotantalate crystals in the recrystallization solvent either in a slightly smaller amount or at a slightly higher temperature than that in the case where the step of removing fine crystals is not involved.

The liquid containing the crystals precipitated is filtered to separate the crystals and the filtrate. The crystals thus obtained are potassium fluorotantalate crystals of the present invention.

(c) Step of Circulation

A preferred embodiment of the present invention may further comprise the step of circulating, as a part of or whole of the starting solution, the filtrate obtained from the filtration conducted in the above step (b). In this case, nearly all of the filtrate obtained can be recycled as mother liquor for subsequent crystallization, so that the valuable tantalum resources can effectively be used without being lost at all. Moreover, since the filtrate contains hydrofluoric acid and hydrochloric acid, it is enough to incorporate hydrofluoric acid and hydrochloric acid into the recrystallization solvent in amounts much smaller than those of the acids that are incorporated into the recrystallization solvent in the case where the filtrate is not circulated.

Potassium Fluorotantalate Crystals

The potassium fluorotantalate crystals produced by the method according to the second embodiment of the present invention contain only an extremely small amount of impurities. Especially in the case where the step of circulation is involved, the content of impurities in the potassium fluorotantalate crystals obtained by recrystallization is approximately constant even when recrystallization is repeatedly conducted many times. This means that the content of impurities in the crystals can always be suppressed to low with the method of the present invention. Specifically, when recrystallization is conducted not more than 20 times in the step of circulation, it is possible to decrease i) the content of the impurities Fe, Ni, Cr, Mn and Cu, calculated from the total amount of the respective metallic elements to preferably 50 ppm by weight or less, more preferably 25 ppm by weight or less, more preferably 15 ppm by weight or less, and most preferably 10 ppm by weight or less of the potassium fluorotantalate crystals, or ii) the content of the impurities Nb, Fe, Ni, Cr, Ca, Mg, Mn, Cu, Si, W, Al, Ti, Mo, Sn, Sb and S, calculated from the total amount of the respective elements to preferably 100 ppm by weight or less, more preferably 50 ppm by weight or less, more preferably 15 ppm by weight or less, and most preferably 10 ppm by weight or less of the potassium fluorotantalate crystals.

If the potassium fluorotantalate crystals have a high content of the impurities Nb, Fe, Ni, Cr, Ca, Mg, Mn, Cu, Si, W, Al, Ti, Mo, Sn, Sb and S, a tantalum condenser produced by the use of tantalum powder that is obtained by reducing the crystals suffers increased leakage; such a tantalum condenser is thus poor in performance. Especially when the content of Fe, Ni, Cr, Mn and Cu in the potassium fluorotantalate crystals is high, the tantalum condenser suffers increased leakage. It is therefore important that the content of Nb, Fe, Ni, Cr, Ca, Mg, Mn, Cu, Si, W, Al, Ti, Mo, Sn, Sb and S, especially that of Fe, Ni, Cr, Mn and Cu in the potassium fluorotantalate crystals be low.

The potassium fluorotantalate crystals obtained by the above method of the present invention have sizes of as large as 0.5 mm or more, preferably 1.68 mm or more. When a powder of the potassium fluorotantalate crystals having such large sizes is placed in a heating furnace located inside an apparatus for reduction with sodium, it is not blown up in the heating furnace. Therefore, not only the inside of the apparatus is not stained with the powder, but also the loss of the powder is avoided. Thus, the large potassium fluorotantalate crystals of the invention are significantly improved in handling properties. In addition, the purity of potassium fluorotantalate crystals depends on their sizes, and, in general, larger crystals are considered to have higher purity. That the potassium fluorotantalate crystals obtained by the method of the invention are large in size is therefore advantageous also in this respect.

According to a preferred embodiment of the present invention, the potassium fluorotantalate crystals contain 40% by weight or more of crystals whose sizes are 0.5 mm or more as determined by sieve analysis. By this, it is possible to fully draw the above-described advantages that result from large crystal sizes.

EXAMPLES

The present invention will now be explained more specifically by referring to the following examples. However, the following examples are not intended to limit or restrict the scope of the invention in any way.

Example A Series

Example A series are a series of examples of the first embodiment of the present invention.

Example A1

To 484 liters of a highly pure tantalum solution (a liquid discharged from a mixer-settler; concentration of tantalum: 100 μl; solvent: water; purity of tantalum: 99.99%; content of impurities: not more than 100 ppm), 178 liters of hydrofluoric acid (concentration: 55% by weight), 166 liters of hydrochloric acid (concentration: 36% by weight), and 1172 liters of pure water were added, and the mixture was stirred to obtain a starting solution. The concentrations of hydrofluoric acid and hydrochloric acid in this starting solution are 5% by weight and 3% by weight, respectively.

After heating the starting solution to 70° C., 50 kg of solid potassium chloride was added to and dissolved in the starting solution. The solution obtained was cooled to 30° C. at a cooling rate of 5° C./h to precipitate potassium fluorotantalate crystals. This crystal-containing liquid was then filtered to obtain 76 kg of the potassium fluorotantalate crystals.

The crystal size distribution of the potassium fluorotantalate crystals was determined by sieve analysis. First of all, the potassium fluorotantalate crystals obtained were sifted by the use of a 10-mesh sieve (size of sieve opening: 1.68 mm), and the crystals remaining on the sieve were weighed. Subsequently, those crystals passed through the above sieve were sifted by the use of a 32-mesh sieve (size of sieve opening: 0.5 mm), and the weight of the crystals remaining on the sieve and that of the crystals passed through the sieve were respectively measured. Percentages by weight of those crystals having sizes of 1.68 mm or more, those crystals having sizes of less than 1.68 mm and 0.5 mm or more, and those crystals having sizes of less than 0.5 mm were then obtained by calculation. The results are shown in Table A-1.

Example A2

To 197 liters of a highly pure tantalum solution (a liquid discharged from a mixer-settler; concentration of tantalum: 100 g/l; solvent: water; purity of tantalum: 99.99%; content of impurities: not more than 100 ppm) was added 755 liters of the filtrate obtained in Example A1, containing 13 g/l of potassium fluorotantalate, 5% by weight of hydrofluoric acid, 3% by weight of hydrochloric acid, and 9.4 g/l of potassium calculated as in the form of potassium chloride, and the mixture was stirred. To this solution were added 33 liters of hydrofluoric acid (concentration: 55% by weight) and 15 liters of hydrochloric acid (concentration: 36% by weight), and the mixture was stirred to obtain a starting solution.

After heating this starting solution to 70° C., 17.8 kg of solid potassium chloride was added to and dissolved in the starting solution. The solution thus obtained is the same as the one obtained in Example A1 except the content of impurities. Thereafter, the procedure of Example A1 was repeated to obtain 38 kg of potassium fluorotantalate crystals. It is noted that the filtrate obtained in this process may be circulated as a part of the starting solution as mentioned previously.

The crystals obtained were subjected to the same sieve analysis as in Example A1. The results are shown in Table A-1.

Example A3

The procedure of Example A2 was repeated to obtain potassium fluorotantalate crystals provided that the cooling rate was changed to 10° C./h. The potassium fluorotantalate crystals obtained were subjected to the same sieve analysis as in Example A1. The results are shown in Table A-1.

Comparative Example A1

The procedure of Example A2 was repeated to obtain potassium fluorotantalate crystals provided that the cooling rate was changed to 20° C./h. The potassium fluorotantalate crystals obtained were subjected to the same sieve analysis as in Example A1. The results are shown in Table A-1.

Comparative Example A2

Commercially available potassium fluorotantalate crystals ($K_2TaF_7$), produced by a conventional production method were subjected to the same sieve analysis as in Example A1. The results are shown in Table A-1.

Results

The results of the sieve analysis conducted in Examples A1, A2 and A3 and Comparative Examples A1 and A2 are shown in Table A-1.

TABLE A-1

Relationship between Cooling Rate and Crystal Size Distribution

|  | Ex. A1 | Ex. A2 | Ex. A3 | Comp. Ex. A1 | Comp. Ex. A2 |
|---|---|---|---|---|---|
| Cooling rate (° C./h) | 5 | 5 | 10 | 20 | — |
| Crystal size distribution (wt. %) |  |  |  |  |  |
| 1.68 mm ≦ | 19 | 17 | 0 | 0 | 0 |
| 1.68 mm > and 0.5 mm ≦ | 72 | 71 | 53 | 4 | 18 |
| 0.5 mm > | 9 | 12 | 47 | 96 | 82 |

Example B Series

Example B series are a series of examples of the second embodiment of the present invention. In the following Examples B1 and B2 and Comparative Examples B1–B4, the tantalum solution, the crude potassium fluorotantalate crystals (crude crystals), and the potassium fluorotantalate crystals were respectively evaluated in the following manners.

Evaluation 1: Measurement of the Contents of Impurities

The content of Cl in the tantalum solution and that of Cl in the crystals were measured by the method of Volhart titration; and the contents of the other impurities in the tantalum solution and in the crystals were measured by ion-exchange separation—ICP emission spectroscopic analysis.

Evaluation 2: Measurement of Crystal Size Distribution

The crystal size distribution of the potassium fluorotantalate crystals was determined by sieve analysis. The potassium fluorotantalate crystals obtained were firstly sifted by the use of a 10-mesh sieve (size of sieve opening: 1.68 mm), and the crystals remaining on the sieve were weighed. Subsequently, the crystals passed through the 10-mesh sieve were sifted by the use of a 32-mesh sieve (size of sieve opening: 0.5 mm), and the weight of the crystals remaining on the sieve and that of the crystals passed through the sieve were respectively measured. Percentages by weight of those crystals having sizes of 1.68 mm or more, those crystals having sizes of less than 1.68 mm and 0.5 mm or more, and those crystals having sizes of less than 0.5 mm were then obtained by calculation.

Separately, the potassium fluorotantalate crystals whose weight had been measured in advance were sifted by the use of a sieve with an opening of 45 µm, and the crystals passed through the sieve were weighed to obtain the percentage by weight of the crystals passed through the sieve with an opening of 45 µm.

Example B1

(a) First Step (Step of Synthesizing Crude Crystals)

To 120 liters of a tantalum solution (a tantalum-scrap-dissolved solution; Ta: 510 g/l; Fe: 20 mg/l; Ni: 150 mg/l; Cr: 25 mg/l; Ca: 50 mg/l; solvent: water), 680 liters of pure water and 32 liters of hydrofluoric acid (concentration: 55% by weight) were added, and the mixture was stirred to obtain 832 liters of a starting solution. After heating this starting solution to 50° C., 75.6 kg (equivalent to 1.5 times the stoichiometric amount) of potassium chloride, precipitator, was added to the solution for reaction. The reaction mixture was then cooled to room temperature (24° C.) over a period of 16 hours to fully precipitate crystals. The crystal-containing liquid was filtered to separate the crude potassium fluorotantalate crystals, which were then washed with 30 liters of pure water. The weight on wet basis of the crude crystals thus obtained was 149.8 kg. The weight on dry basis of the crude crystals, as determined after these crude crystals were placed in a polytetrafluoroethylene container and dried in a constant temperature oven at 180° C. for approximately 16 hours, was 131.8 kg.

The dry crude crystals were subjected to the above-described Evaluation 1. The results are shown in Table B-1.

(b) Second Step (Recrystallization of First Time)

To 81.8 liters of pure water were added 8.2 liters of hydrofluoric acid (concentration: 55% by weight) and 10.0 liters of hydrochloric acid (concentration: 35% by weight), and the mixture was stirred to obtain 100 liters of a recrystallization solvent. While maintaining the temperature of the recrystallization solvent at 70° C., 5.68 kg (wet basis, weight on dry basis: 5.0 kg) of the crude crystals obtained in the above step (a) were dissolved in this recrystallization solvent. The solution obtained was cooled to 25° C. at a cooling rate of 5° C./h to precipitate potassium fluorotantalate crystals. The crystal-containing liquid was filtered to separate the crystals, which were then washed with 3 liters of pure water. The crystals washed were placed in a polytetrafluoroethylene-made container, and dried in a constant temperature oven at 180° C. for approximately 16 hours to obtain 3.88 kg of potassium fluorotantalate crystals of the present invention.

The crystals obtained were subjected to the above-described Evaluations 1 and 2. The results are shown in Tables B-1 and B-2.

(c) Circulation Step (Recrystallization of Second to Twentieth Time)

The contents of F and Cl in the filtrate obtained from the above recrystallization step were determined by the fluoride ion electrode method and the method of Volhard titration, respectively. The substantial concentration value of hydrofluoric acid was obtained by subtracting the concentration value of F derived from potassium fluorotantalate dissolved in the filtrate from that of F obtained by the above method. On the basis of the measured values obtained, proper amounts of hydrofluoric acid (concentration: 55% by weight), hydrochloric acid (concentration 35% by weight), waste washing water and pure water were added to the filtrate so that the concentrations of hydrofluoric acid (excluding F derived from potassium fluorotantalate) and hydrochloric acid in the resulting mixture would be 5% by weight and 4% by weight, respectively.

This filtrate with the concentrations of hydrofluoric acid and hydrochloric acid properly adjusted was used as a recrystallization solvent to be circulated.

While maintaining the temperature of 100 liters of the recrystallization solvent at 70° C., 4.55 kg (wet basis, weight on dry basis: 4.0 kg) of the crude crystals obtained in the above step (a) were dissolved in this recrystallization solvent. The solution obtained was cooled to 25° C. at a cooling rate of 5° C./h to precipitate potassium fluorotantalate crystals. The crystal-containing liquid was filtered to separate the crystals, which were then washed with 3 liters of pure water. The crystals washed were placed in a polytetrafluoroethylene-made container, and dried in a constant temperature oven at 180° C. for approximately 16 hours to obtain potassium fluorotantalate crystals of the invention in an amount of 3.88 to 3.94 kg per operation.

The crystals obtained were subjected to Evaluation 1 and 2. The results are shown in Tables B-1 and B-2.

TABLE B-1

| | | | Contents of Impurities | | | | |
|---|---|---|---|---|---|---|---|
| Impurity Analyzed | In Ta Sol'n | In Crude Crystals | Content of Impurity In Crystals Obtained after Crystallization of | | | | |
| | | | 1st Time | 5th Time | 10th Time | 15th Time | 20th Time |
| Nb | 5 | 5 | 1 | 2 | 2 | 2 | 2 |
| Fe | 20 | 2 | 2> | 2> | 2 | 2 | 2 |
| Ni | 150 | 5 | 2> | 2> | 2> | 2> | 2 |
| Cr | 25 | 2 | 1> | 1 | 1 | 1 | 2 |
| Ca | 50 | 2 | 1> | 1 | 1 | 1 | 1 |
| Mg | 80 | 5 | 1> | 1> | 1> | 1> | 1> |
| Mn | 220 | 4 | 1> | 1> | 1 | 1 | 1 |

TABLE B-1-continued

Contents of Impurities

| Impurity Analyzed | In Ta Sol'n | In Crude Crystals | Content of Impurity In Crystals Obtained after Crystallization of | | | | |
|---|---|---|---|---|---|---|---|
| | | | 1st Time | 5th Time | 10th Time | 15th Time | 20th Time |
| Cu | 3 | 1 | 1 | 1 | 1 | 1 | 1 |
| Si | 15 | 10> | 10> | 10> | 10> | 10> | 10> |
| W | 4 | 2 | 1 | 2 | 2 | 2 | 2 |
| Al | 4 | 2 | 2> | 2> | 2 | 2 | 2 |
| Ti | 10 | 2 | 1> | 1 | 1 | 2 | 2 |
| Mo | 5 | 2 | 1 | 2 | 2 | 2 | 2 |
| Sn | 12 | 10> | 10> | 10> | 10> | 10> | 10> |
| Sb | 10 | 1 | 1> | 1> | 1> | 1> | 1> |
| S | 4 | 2 | 1 | 2 | 2 | 2 | 2 |
| Cl | — | 0.03> | 0.03> | 0.03> | 0.03> | 0.03> | 0.03> |
| Water Content | — | — | 0.1> | 0.1> | 0.1> | 0.1> | 0.1> |
| Undersize | — | — | 2 | 1 | 1> | 1 | 1 |

Note)
The contents of the respective impurities in the Ta solution are shown in mg/l. With respect to the impurities Nb to S in the above table, their contents in the crude crystals and those in the crystals recrystallized are shown in ppm by weight. The content of Cl in the crude crystals and that of Cl in the crystals recrystallized are shown in % by weight. The water content is shown in percentage by weight determined by the loss-on-heating method (200° C., 2 hours). The undersize is shown in percentage by weight of the crystals passed through a sieve with an opening of 45 μm.

TABLE B-2

Crystal Size Distribution

| Recrystallization | Crystal Size Distribution (wt. %) | | |
|---|---|---|---|
| | 1.68 mm≦ | 1.68 mm> and 0.5 mm≦ | 0.5 mm> |
| After 1st Time | 19 | 67 | 14 |
| 5th Time | 20 | 70 | 10 |
| 10th Time | 22 | 69 | 9 |
| 15th Time | 17 | 71 | 12 |
| 20th Time | 17 | 72 | 11 |

Example B2

The procedure of Example B1 (b) was repeated to conduct recrystallization provided that the cooling rate was changed to 10° C./h. The crystals obtained were subjected to the measurement of weight and also to Evaluation 2. The results are shown in Table B-3.

Comparative Example B1

The procedure of Example B1 (b) was repeated to conduct recrystallization provided that the cooling rate was changed to 20° C./h. The crystals obtained were subjected to the measurement of weight and also to Evaluation 2. The results are shown in Table B-3.

TABLE B-3

Weight of Crystals and Crystal Size Distribution

| | Weight of Crystals (kg) | Crystal Size Distribution (wt. %) | | |
|---|---|---|---|---|
| | | 1.68 mm≦ | 1.68 mm> and 0.5 mm≦ | 0.5 mm> |
| Ex. B2 | 3.86 | 1 | 55 | 44 |
| Comp. Ex. B1 | 3.9 | 0 | 5 | 95 |

Comparative Example B2

This Comparative Example is an example of the case where hydrochloric acid is added in the first step, and the circulation step is conducted without effecting the second step.

(a) Step of Synthesizing Potassium Fluorotantalate (Crystallization of First Time)

To 4.53 liters of the same tantalum solution as in Example B1, 77.27 liters of pure water, 8.2 liters of hydrofluoric acid (concentration: 55% by weight) and 10.0 liters of hydrochloric acid (concentration: 35% by weight) were added, and the mixture was stirred to obtain 100 liters of a starting solution (concentration of hydrofluoric acid: 5% by weight; concentration of hydrochloric acid: 4% by weight). After heating this starting solution to 70° C., 2.38 kg (equivalent to 1.25 times the stoichiometric amount) of potassium chloride, precipitator, was added to the starting solution for reaction. The reaction mixture was then cooled to 25° C. at a cooling rate of 5° C./h to fully precipitate crystals, and the crystal-containing liquid was filtered to separate the crystals. After washing the crystals with 3 liters of pure water, they were placed in a polytetrafluoroethylene-made container, and dried in a constant temperature oven at 180° C. for approximately 16 hours to obtain 3.89 kg of potassium fluorotantalate crystals.

(b) Circulation Step (Crystallization of Second to Twentieth Time)

The contents of F and Cl in the filtrate obtained from the above crystallization step were measured by the fluoride ion electrode method and the method of Volhard titration, respectively. The substantial concentration value of hydrofluoric acid was obtained by subtracting the concentration value of F derived from potassium fluorotantalate dissolved in the filtrate from that of F obtained by the above method. On the basis of the measured values obtained, proper amounts of hydrofluoric acid (concentration: 55% by weight), hydrochloric acid (concentration 35% by weight), waste washing water and pure water were added to the filtrate so that the concentrations of hydrofluoric acid (excluding F derived from potassium fluorotantalate) and hydrochloric acid in a mixture of the filtrate and a tantalum solution would be 5% by weight and 4% by weight, respectively. To this filtrate was added 3.53 liters of the same tantalum solution as in the above step (a) to obtain 100 liters of a starting solution (concentration of hydrofluoric acid: 5% by weight, concentration of hydrochloric acid: 4% by weight). While maintaining the temperature of the starting solution at 70° C., 1.49 kg of potassium chloride was dissolved in it. This solution was then cooled to 25° C. at a cooling rate of 5° C./h to precipitate crystals, and the crystal-containing liquid was filtered to separate the crystals. After washing the crystals with 3 liters of pure water, they were placed in a polytetrafluoroethylene-made container, and dried in a constant temperature oven at 180° C. for approximately 16 hours to obtain potassium fluorotantalate crystals in an amount of 3.80 to 3.94 kg per operation.

The crystals obtained were subjected to Evaluations 1 to 2. The results are shown in Tables B-4 and B-5.

TABLE B-4

Contents of Impurities

| Impurity Analyzed | In Ta Sol'n | Content of Impurity In Crystals Obtained after Crystallization of | | | | |
|---|---|---|---|---|---|---|
| | | 1st Time | 5th Time | 10th Time | 15th Time | 20th Time |
| Nb | 5 | 2 | 3 | 3 | 3 | 3 |
| Fe | 20 | 3 | 9 | 12 | 14 | 14 |
| Ni | 150 | 4 | 13 | 22 | 29 | 34 |
| Cr | 25 | 2 | 7 | 11 | 13 | 14 |
| Ca | 50 | 3 | 10 | 16 | 20 | 23 |
| Mg | 80 | 3 | 10 | 17 | 22 | 25 |
| Mn | 220 | 5 | 19 | 32 | 42 | 50 |
| Cu | 3 | 3 | 3 | 4 | 3 | 4 |
| Si | 15 | 10> | 13 | 12 | 14 | 13 |
| W | 4 | 3 | 4 | 3 | 4 | 4 |
| Al | 4 | 2> | 2 | 3 | 3 | 3 |
| Ti | 10 | 1 | 4 | 5 | 6 | 7 |
| Mo | 5 | 3 | 4 | 4 | 4 | 4 |
| Sn | 12 | 10> | 10 | 11 | 12 | 11 |
| Sb | 10 | 1> | 1 | 1 | 2 | 3 |
| S | 4 | 2 | 4 | 4 | 4 | 5 |
| Cl | — | 0.03> | 0.03> | 0.03> | 0.03> | 0.03> |
| Water Content | — | 0.1> | 0.1> | 0.1> | 0.1> | 0.1> |
| Undersize | — | 1> | 1 | 1 | 2 | 1> |

Note)
The contents of the respective impurities in the Ta solution are shown in mg/l. With respect to the impurities Nb to S in the above table, their contents in the crystals are shown in ppm by weight. The content of Cl in the crystals is shown in % by weight. The water content is shown in percentage by weight determined by the loss-on-heating method (200° C., 2 hours). The undersize is shown in percentage by weight of the crystals passed through a sieve with an opening of 45 μm.

TABLE B-5

Crystal Size Distribution

| Crystallization | Crystal Size Distribution (wt. %) | | |
|---|---|---|---|
| | 1.68 mm ≤ | 1.68 mm> and 0.5 mm ≤ | 0.5 mm> |
| After 1st Time | 20 | 71 | 9 |
| 5th Time | 17 | 71 | 12 |
| 10th Time | 19 | 71 | 10 |
| 15th Time | 18 | 67 | 15 |
| 20th Time | 23 | 69 | 8 |

Comparative Example B3

This Comparative Example is an example of the case where recrystallization is conducted without adding hydrochloric acid.

To 91.8 liters of pure water was added 8.2 liters of hydrofluoric acid (concentration: 55% by weight), and the mixture was stirred to obtain 100 liters of a recrystallization solvent (concentration of hydrofluoric acid: 5% by weight). While maintaining the temperature of 100 liters of this recrystallization solvent at 70° C., 4.20 kg (wet basis, weight on dry basis: 3.7 kg) of the crude potassium fluorotantalate crystals obtained in Example B1 (a) were dissolved in this recrystallization solvent. This solution was cooled to 25° C. at a cooling rate of 5° C./h to precipitate potassium fluorotantalate crystals. The crystal-containing liquid was filtered to separate the potassium fluorotantalate crystals, which were then washed with 3 liters of pure water. The crystals washed were placed in a polytetrafluoroethylene-made container, and dried in a constant temperature oven at 180° C. for approximately 16 hours to obtain potassium fluorotantalate crystals. The amount of the crystals obtained was as small as 2.58 kg.

Comparative Example B4

Commercially available potassium fluorotantalate crystals ($K_2TaF_7$), produced by a conventional production method were subjected to Evaluation 2 to determine their crystal size distribution. The results are as follows:

1.68 mm or more: 0% by weight, less than 1.68 mm and 0.5 mm or more: 18% by weight, and less than 0.5 mm: 82% by weight.

Results

Although recrystallization was repeatedly conducted many times in Examples B1 and B2, there were obtained, after recrystallization of each time, highly pure potassium fluorotantalate in high yield as compared with Comparative Examples B1 to B4. It was also confirmed that the potassium fluorotantalate crystals obtained in Examples B1 and B2 were satisfactorily large.

What is claimed is:

1. A method for producing potassium fluorotantalate crystals, comprising the steps of:

heating, to 60° C. or higher, a starting solution prepared by adding hydrofluoric acid and hydrochloric acid, and, if necessary, water to a highly pure tantalum solution, adding potassium chloride to this starting solution to form a mixture, and cooling the mixture to 40° C. or lower at a cooling rate of less than 15° C./h to precipitate potassium fluorotantalate crystals, wherein the concentration of the hydrofluoric acid in the starting solution is not more than 20% by weight.

2. The method according to claim 1, wherein the concentration of the hydrofluoric acid in the starting solution is from 1 to 10% by weight.

3. The method according to claim 1, wherein the concentration of the hydrochloric acid in the starting solution is from 1 to 6% by weight.

4. The method according to claim 1, wherein the concentration of tantalum in the highly pure tantalum solution is 20 g/l or more.

5. The method according to claim 1, wherein the cooling rate is less than 10° C./h.

6. The method according to claim 1, further comprising the step of separating by filtration the potassium fluorotantalate crystals from the mixture after the precipitation of the potassium fluorotantalate crystals, and circulating the filtrate as a part of or whole of the starting solution.

7. A method for producing potassium fluorotantalate crystals, comprising the steps of:

(a) a first step in which a potassium-containing electrolyte is added to a starting solution containing tantalum to precipitate crude potassium fluorotantalate crystals, and the crude crystals are separated by filtration, and (b) a second step in which, after heating, to 60° C. or higher, a recrystallization solvent which is an aqueous solution containing hydrochloric acid and hydrofluoric acid, the crude potassium fluorotantalate crystals are dissolved in this recrystallization solvent, and the solution is cooled to 40° C. or lower at a cooling rate of less than 15° C./h to precipitate potassium fluorotantalate crystals.

8. The method according to claim 7, wherein the potassium-containing electrolyte is at least one compound selected from the group consisting of potassium chloride, potassium carbonate, potassium hydroxide, and potassium fluoride.

9. The method according to claim 7, wherein the starting solution contains water and/or hydrofluoric acid.

10. The method according to claim 7, wherein the concentration of the hydrofluoric acid in the starting solution is not more than 20% by weight.

11. The method according to claim 7, wherein the concentration of the tantalum in the starting solution is from 20 to 200 g/l.

12. The method according to claim 7, wherein the potassium-containing electrolyte is added to the starting solution in an amount ranging from 1.2 to 2.0 times the stoichiometric amount.

13. The method according to claim 7, wherein the temperature of the starting solution at the time when the potassium-containing electrolyte is added thereto is from 30 to 70° C., and that of the starting solution at the time when the crude potassium fluorotantalate crystals are separated therefrom by filtration is lower than 30° C.

14. The method according to claim 7, wherein the concentration of the hydrofluoric acid in the recrystallization solvent is not more than 20% by weight.

15. The method according to claim 7, wherein the concentration of the hydrochloric acid in the recrystallization solvent is from 1 to 6% by weight.

16. The method according to claim 7, wherein the cooling rate is less than 10° C./h.

17. The method according to claim 7, further comprising, prior to the step of cooling, the step of removing fine particles present in the recrystallization solvent in which the crude potassium fluorotantalate crystals have been dissolved.

18. The method according to claim 7, further comprising the step of separating by filtration the potassium fluorotantalate crystals from the solution after the precipitation of the potassium fluorotantalate crystals, and circulating the filtrate as a part of or whole of the recrystallization solvent.

* * * * *

UNITED STATES PATENT AND TRADEMARK OFFICE
CERTIFICATE OF CORRECTION

PATENT NO. : 6,764,669 B2
DATED : July 20, 2004
INVENTOR(S) : Isaka et al.

It is certified that error appears in the above-identified patent and that said Letters Patent is hereby corrected as shown below:

Title page,
Item [56], References Cited, U.S. PATENT DOCUMENTS, add the following:
-- 2003/0136330    7/2003    Sohama et al.    117/2
   5,635,146      6/1997    Singh et al.     423/65
   6,010,676      1/2000    Singh et al.     423/464 --

Signed and Sealed this

Fifth Day of April, 2005

JON W. DUDAS
*Director of the United States Patent and Trademark Office*